United States Patent
Tu et al.

(10) Patent No.: US 11,270,052 B2
(45) Date of Patent: Mar. 8, 2022

(54) SYSTEM AND METHOD OF TIMING CHARACTERIZATION FOR SEMICONDUCTOR CIRCUIT

(71) Applicant: TAIWAN SEMICONDUCTOR MANUFACTURING COMPANY LTD., Hsinchu (TW)

(72) Inventors: Chia Hao Tu, Tainan (TW); Hsueh-Chih Chou, Tainan (TW); Sang Hoo Dhong, Hsinchu (TW); Jerry Chang Jui Kao, Taipei (TW); Chi-Lin Liu, New Taipei (TW); Cheng-Chung Lin, Hsinchu (TW); Shang-Chih Hsieh, Taoyuan County (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 0 days.

(21) Appl. No.: 17/021,702

(22) Filed: Sep. 15, 2020

(65) Prior Publication Data

US 2020/0410152 A1    Dec. 31, 2020

Related U.S. Application Data

(63) Continuation of application No. 16/578,989, filed on Sep. 23, 2019, now Pat. No. 10,824,784.

(60) Provisional application No. 62/737,008, filed on Sep. 26, 2018.

(51) Int. Cl.
*G06F 30/3312* (2020.01)
*G06F 1/14* (2006.01)

(52) U.S. Cl.
CPC ............ *G06F 30/3312* (2020.01); *G06F 1/14* (2013.01)

(58) Field of Classification Search
CPC ............................... G06F 30/3312; G06F 1/14
USPC ......................................................... 716/108
See application file for complete search history.

(56) References Cited

U.S. PATENT DOCUMENTS

| | | | | |
|---|---|---|---|---|
| 6,618,841 B1* | 9/2003 | Huang | ................. | G06F 30/3323 716/103 |
| 6,640,330 B1* | 10/2003 | Joshi | ....................... | G06F 30/33 716/108 |
| 8,566,767 B1* | 10/2013 | Kukai | ................. | G06F 30/3312 716/108 |
| 8,713,502 B1* | 4/2014 | Date | .................... | G06F 30/3312 716/113 |
| 2003/0204818 A1* | 10/2003 | Kashyap | ............... | G06F 30/367 716/101 |
| 2004/0015338 A1* | 1/2004 | Lawrence | ............. | G06F 30/367 703/13 |

(Continued)

*Primary Examiner* — Suresh Memula
(74) *Attorney, Agent, or Firm* — WPAT, P.C., Intellectual Property Attorneys; Anthony King

(57) ABSTRACT

A method includes: receiving a library associated with a cell; determining a plurality of candidate hold times for the cell; acquiring a plurality of candidate setup times corresponding to the plurality of candidate hold times, wherein a data delay associated with each of the candidate setup time fulfills a data delay constraint for the cell; adding the plurality of candidate setup times to the plurality of candidate hold times, respectively, to obtain a plurality of candidate time windows; and selecting a target time window having a minimal time span among the candidate time windows. At least one of the receiving, determining, acquiring, adding and selecting steps is conducted by at least one processor.

20 Claims, 12 Drawing Sheets

(56) References Cited

U.S. PATENT DOCUMENTS

| | | | |
|---|---|---|---|
| 2004/0060012 A1* | 3/2004 | Lu | G06F 30/327 |
| | | | 716/104 |
| 2004/0128634 A1* | 7/2004 | Johnson | G06F 30/327 |
| | | | 716/114 |
| 2004/0249588 A1* | 12/2004 | Shimazaki | G06F 30/33 |
| | | | 702/66 |
| 2006/0031808 A1* | 2/2006 | Toyoda | G06F 30/3312 |
| | | | 716/108 |
| 2006/0117287 A1* | 6/2006 | Bergler | G06F 30/3312 |
| | | | 716/108 |
| 2007/0226668 A1* | 9/2007 | Dasdan | G06F 30/3312 |
| | | | 716/108 |
| 2008/0228460 A1* | 9/2008 | Lin | G06F 30/3312 |
| | | | 703/14 |
| 2009/0125858 A1* | 5/2009 | Vishweshwara | G06F 30/3312 |
| | | | 716/113 |
| 2009/0241080 A1* | 9/2009 | Yang | G06F 30/3312 |
| | | | 716/113 |
| 2012/0221313 A1* | 8/2012 | Patra | G06F 30/3312 |
| | | | 703/19 |
| 2016/0344645 A1* | 11/2016 | Zhang | G06F 15/00 |
| 2017/0011154 A1* | 1/2017 | Gupta | G06F 30/367 |
| 2018/0278253 A1* | 9/2018 | Lu | H03K 5/135 |
| 2018/0314783 A1* | 11/2018 | Moroz | G06F 30/398 |
| 2019/0243938 A1* | 8/2019 | Kim | G06F 30/3312 |
| 2021/0081691 A1* | 3/2021 | Chen | G06K 9/00979 |

* cited by examiner

SYSTEM AND METHOD OF TIMING CHARACTERIZATION FOR SEMICONDUCTOR CIRCUIT

PRIORITY CLAIM AND CROSS-REFERENCE

This application claims priority to U.S. Patent Provisional Application No. 62/737,008 filed Sep. 26, 2018 and U.S. patent application Ser. No. 16/578,989 filed Sep. 23, 2019, the disclosures of which are hereby incorporated by reference in its entirety.

BACKGROUND

In advanced semiconductor technologies, the continuing reduction in device size and increasingly complicated circuit arrangements have made the designing and fabrication of integrated circuits (ICs) more challenging and costly. Before the circuit design for the ICs is delivered for mass production, the design must be confirmed to meet the design specification and manufacturing criteria. In order to detect design errors or defects as early as possible, computer-aided circuit design tools, which assist circuit designers in identifying potential circuit errors, have become widely accepted in the semiconductor industry. However, as circuit complexity and device density continue to increase quickly, the software procedures that conduct circuit design and verification now consume a great deal of time and resources, and have difficulties in meeting the demands for circuit design in early design stages. Therefore, it is necessary to improve the design flow for reducing the design cycle time while maintaining the design quality.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION

Figure 1:
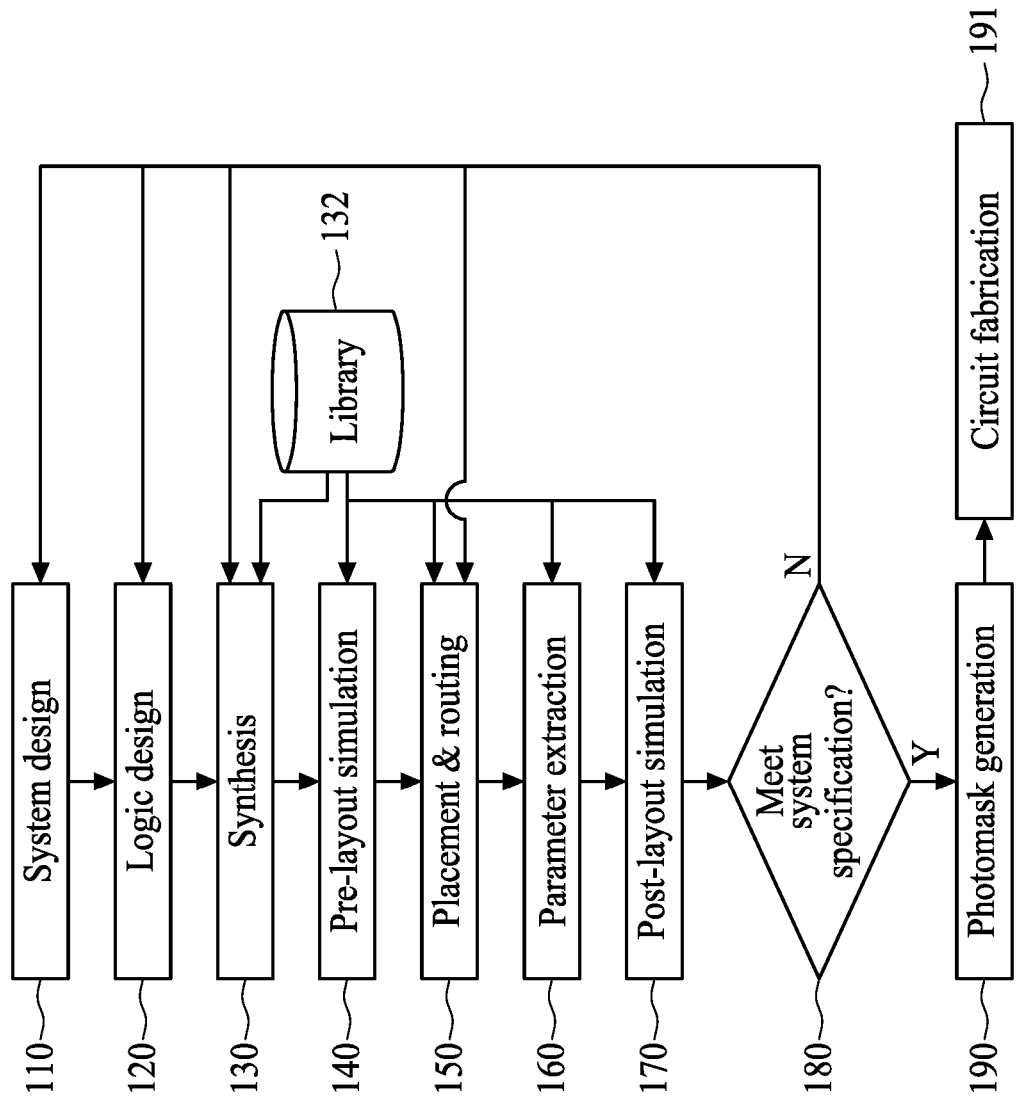
FIG. 1 is a schematic diagram illustrating a design flow of an integrated circuit (IC), in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the deviation normally found in the respective testing measurements. Also, as used herein, the terms "about," "substantial" or "substantially" generally mean within 10%, 5%, 1% or 0.5% of a given value or range. Alternatively, the terms "about," "substantial" or "substantially" mean within an acceptable standard error of the mean when considered by one of ordinary skill in the art. Other than in the operating/working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the terms "about," "substantial" or "substantially." Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques. Ranges can be expressed herein as from one endpoint to another endpoint or between two endpoints. All ranges disclosed herein are inclusive of the endpoints, unless specified otherwise.

The present disclosure discusses a timing parameter calculation methodology for characterizing a logic element in the design stage of manufacturing semiconductor ICs. When a synthesis operation is used for implementing a design idea (e.g., a circuit layout is generated as design data), a cell library is usually provided for facilitating the design process. The cell library may include a list of standard cells with associated parameters describing the electrical or geometrical characteristics of the cells in a quantitative perspective. Among the parameters for ensuring proper functioning of the sequential logic cells, the setup time and hold time are recognized as two essential elements. For a typical sequential logic cell, e.g., a register or a latch, that has a data input port and a clock input port, the input data signal received from the data input port needs to be in a stable state before, during and after the clock transition in order for such sequential logic cell to successfully record the input data. To be specific, the setup time is generally referred to as the minimum length of time before the clock transition time during which the input data signal must be stable. The hold time is generally referred to as the minimum length of time after the clock transition time during which the input data signal must remain stable. The setup time and hold time therefore collectively comprise a time window during which the input data signal remains stable. A greater time window provides greater tolerance for data access, but introduces a longer delay. Therefore, an optimized setup time or hold time is sought to strike a balance between the circuit speed and system integrity. Moreover, the timing parameters should be determined with care in order to deal with timing paths that are loaded to a sequential cell having large differences in path delay.

When the cells are identified and incorporated into the design data, their associated timing parameters are provided as side information for use in simulating the design data. In most cases, if one or more timing paths are identified as violating the design requirements during a timing analysis phase, e.g., static timing analysis, in which a setup time violation or a hold time violation is found, it is determined that the design data fails to meet the design specification. Such timing violations usually occur to sequential cells that are loaded with a short path and a long path in which the long path has a relatively much longer delay than the short path. Additional iterations of design refinement may be required to generate a design data in which all the timing issues are resolved. However, in some instances a design data may contain an erroneous logic path that successfully passes the timing analysis, but that is subsequently detected in a later simulation, or, worse yet, is not detected until the functional test of the fabricated chip. As a result, the cost and cycle time for the circuit design may be increased significantly.

In the present disclosure, an improved timing characterization method and a system for implementing the method are proposed. In order to address the increasing likelihood of logic paths with timing violations that cannot be successfully identified in a current design environment, it is proposed to revisit the design of standard cell libraries in which the timing parameters, e.g., the setup time and the hold time of a sequential logic cell, are reshaped. A timing characterization scheme is applied to further increase the required length of the setup time or the hold time of the sequential logic cell. As such, by moderately increasing the setup time and the hold time, the timing violations resulting from the large delay difference between the short and long paths for the sequential logic cell can be corrected. Meanwhile, the circuit speed is kept at an acceptable level with the increased setup time and increased hold time. The performance of the static timing analysis and troubleshooting can be enhanced accordingly.

FIG. 1 is a schematic diagram illustrating a design flow 10 of a semiconductor integrated circuit (IC), in accordance with some embodiments. The design flow 10, employed for designing semiconductor ICs or chips, utilizes one or more electronic design automation (EDA) tools to perform operations therein. A workstation or personal computer is typically used in executing the tools to accomplish the design flow 10. The design flow 10 includes a system design stage 110, a logic design stage 120, a synthesis stage 130, a pre-layout simulation stage 140, a placement and routing development stage 150, a parameter extraction stage 160, a post-layout simulation stage 170, a photomask generation stage 190 and a circuit fabrication stage 191.

Initially, at the system design stage 110, a systematic architecture for the chip of interest is provided with a high-level description. During stage 110, the chip functions along with performance requirements are determined according to a design specification. The chip functions are usually represented by respective schematic functional modules or blocks. In addition, an optimization or performance trade-off may be sought to achieve the design specification at acceptable levels of cost and power.

At the logic design stage 120, the functional modules or blocks are described in a register transfer level (RTL) using a hardware description language. Commercially available language tools are generally used, such as Verilog or VHDL. In an embodiment, a preliminary functionality check is performed during stage 120 to verify if the implemented functions conform to the specification set forth in stage 110.

Subsequently, at the synthesis stage 130, the modules in the RTL descriptions are converted into an instance of design data, e.g., netlist data, where the circuit structure, e.g., logic gates and registers, of each function module are established. In an embodiment, a standard cell library 132 is provided to supply different classes of low-level circuits, i.e., standard cells, serving specific Boolean logic or sequential logic functions. In some embodiments, technology mapping of logic gates and registers to available cells in the standard cell libraries are conducted. Further, the design data or netlist data is offered to describe the functional relationship of the chip at a gate level. The standard cell library 132 may be provided by an IC designer, an IC manufacturing company, a computer-aided design (CAD) tool provider or any relevant third party. The standard cell library 132 also provides the parameters associated with each cell, such as the timing, power, voltage, and the like. In an embodiment, the netlist data is transformed from the gate-level view to a transistor-level view. In an embodiment, when the library is provided or updated (as will be described in subsequent paragraphs herein) and incorporated into the CAD tool, the IC designer can improve the updated library by identifying violations of the design rule (e.g., timing violations) and revising the original netlist data in response to the identified violations.

Subsequently, the gate-level netlist data is verified at the pre-layout simulation stage 140. During the verification process of stage 140, if some functions fail the verification in the simulation, the design flow 10 may be paused temporarily or may go back to stage 110 or 120 for further modification. After the pre-layout simulation stage 140, the chip design has passed a preliminary verification and the front-end design process is completed. Next, a back-end physical design process is conducted.

During the placement and routing stage 150, a physical architecture representing the chip, determined during the front-end process, is implemented. The layout development involves a placement operation and a routing operation in sequence. Detailed structures and associated geometries for the components of the chip are determined in the placement operation. Interconnects among different components are routed subsequent to the placement operation. Both placement and routing operations are performed to meet the requirement of a design rule check (DRC) deck so that the manufacturing constraints of the chip are fulfilled. In an embodiment, a clock tree synthesis operation is performed at the placement and routing stage for a digital circuit in which clock generators and circuits are incorporated into the design. In an embodiment, a post-routing operation is performed subsequent to the preliminary routing operation in order to resolve timing issues discovered during the preliminary routing operation. Once the placement and routing stage 150 is completed, a placed-and-routed layout is created and a netlist along with data on placement and routing is generated accordingly.

During the parameter extraction stage 160, a layout parameter extraction (LPE) operation is conducted to derive layout-dependent parameters, such as parasitic resistance and capacitance, based on the layout developed in the placement and routing stage 150. Subsequently, a post-layout netlist data, which includes the layout-dependent parameters, is generated.

During the post-layout simulation stage 170, a physical verification is performed, taking into consideration the parameters acquired in previous stages. A simulation of transistor-level behavior is conducted to examine whether the chip performance derived by the post-layout netlist meets the required system specifications. In some embodiments, the post-layout simulation is performed to minimize probability of electrical issues or layout difficulties during the chip manufacturing process. In an embodiment, the standard cell library 132 is provided not only to the operations in stage 130, but also to the operations in stages 140, 150, 160 and 170 so that the electrical or geometric parameters of cells and other features listed in the standard cell library 132 can be leveraged to emulate the real-world performance of the circuits throughout the design phase.

Next, in stage 180, it is determined whether the post-layout netlist meets the design specifications. If the result of the post-layout simulation is unfavorable, the design flow 10 loops back to previous stages for tuning functionalities or structures. For example, the design flow 10 may loop back to stage 150 where the layout is re-developed to resolve issues from a physical perspective. Alternatively, the design flow 10 may retreat to an earlier stage 110 or 120 to recast the chip design from a functional level in case the problems cannot be resolved within the back-end process.

If the post-layout netlist passes the verification, the circuit design is accepted and then signed off accordingly. The chip is manufactured according to the accepted post-layout netlist. In an embodiment, during stage 190, at least one photomask is generated based on the verified post-layout netlist in stage 170. A photomask is a patterned mask used to allow a portion of light to pass through while blocking other portions of the light in order to form a pattern of features on a light-sensitive layer, e.g., a photoresist layer, on a wafer. The photomask is used to transfer the patterns of the verified post-layout netlist onto wafers. In some embodiments, a multi-layer layout netlist may require a set of photomasks in which the feature pattern in each layer is established in the corresponding photomask. As a result, the patterns of the layout netlist formed on the photomasks are transferred to the light-sensitive layer through an exposure operation.

During stage 191, the circuit is fabricated on the wafer using the photomasks generated in stage 190. The fabrication may involve known semiconductor manufacturing operations, such as lithography, etching, deposition, and thermal operations. In some embodiments, a testing operation may be utilized in an intermediate or final phase of stage 191 to ensure physical and functional integrity of the fabricated circuit. In some embodiments, a singulation operation may be used to separate the circuit wafer into individual circuit dies. The fabrication of the circuit is thus completed.

The design flow 10 illustrated in FIG. 1 is exemplary. Modifications to the above-mentioned stages, such as change of order for the stages, partition of the stages, and deletion or addition of stages, are within the contemplated scope of the present disclosure.

Figure 2A:
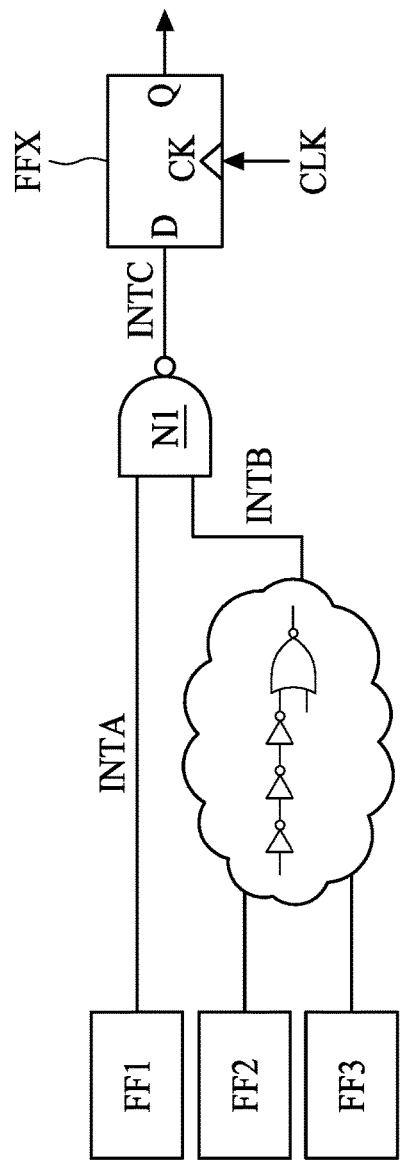
FIG. 2A is a schematic circuit diagram in accordance with some embodiments.

FIG. 2A is a schematic circuit diagram 20 in accordance with some embodiments. The circuit 20 is representative of a design data (e.g., the netlist data in FIG. 1) and includes several sequential logic cells, such as flip-flops FF1, FF2, FF3 and FFX. A combinational logic cell, i.e., a NAND gate N1, receives input data from the flip-flops FF1, FF2 and FF3 through a first path INTA and a second path INTB, respectively, and provides output data to the flip-flop FFX through a third path INTC. The first path INTA is formed between the flip-flop FF1 and the NAND gate N1 free of other circuits. The second path INTB is formed between the two flip-flops FF2 and FF3 and the NAND gate N1 with additional intervening sequential cells. It is presumed that the first path INTA generates a short delay, while the second path INTB generates a relatively long delay compared to the first path INTA due to the intervening cells. The flip-flop FFX has an input port D, an output port Q, and a clock input CK. The output data signal of the gate N1 is loaded to the input port D through the third path INTC and a reference clock signal CLK is fed to the clock input CK. The flip-flop FFX reads the input data signal in synchronization with the reference clock signal CLK at the rising edge or falling edge of the reference clock signal CLK and provides the output data with a data delay of the cell. Such data delay, generally referred to as a clock-to-Q time (Clk_to_q), is defined as a time difference between the rising edge of the reference clock signal CLK and the time at which the output data signal attains its desired level.

Figure 2B:
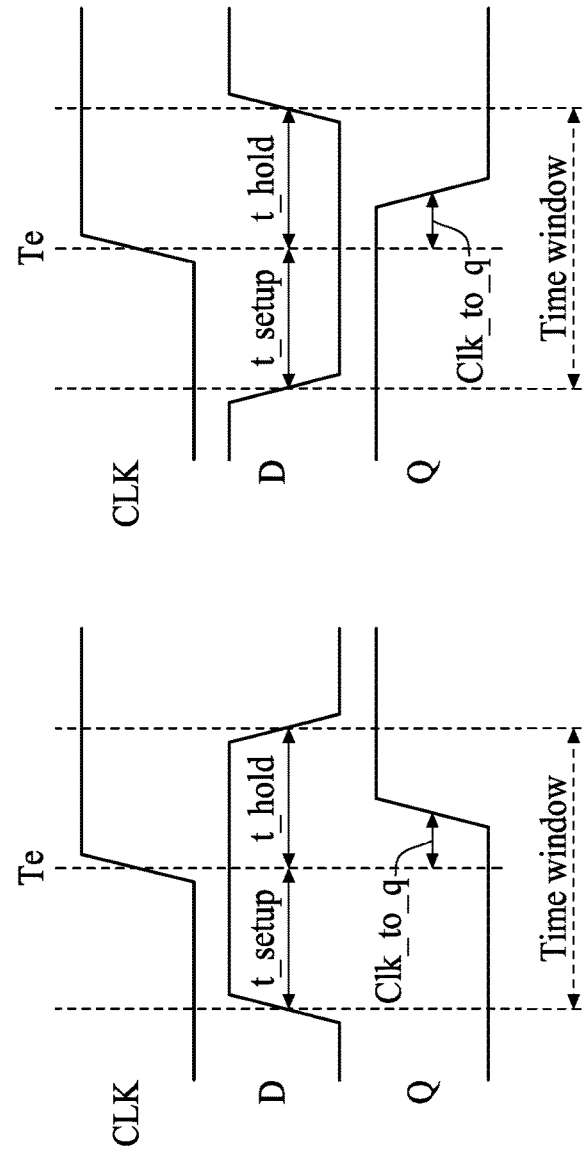
FIG. 2B is a schematic diagram showing a setup time and a hold time of a sequential cell in the circuit of FIG. 2A, in accordance with some embodiments.

FIG. 2B is a schematic diagram showing a setup time and a hold time of a sequential cell, such as the flip-flop FFX, in the circuit 20 of FIG. 2A, in accordance with some embodiments. Assume that the input data signal at the input port D of the flip-flop FFX is to be read at a time Te of the rising-edge of the reference clock signal CLK. The left plot of FIG. 2B shows an input data signal at a high level, and the right plot of FIG. 2B shows another input data signal at a low level. As discussed previously, the setup time (t_setup) of the flip-flop FFX is defined as a time span during which the input data signal should be ready before the rising-edge time Te. The hold time (t_hold) of the flip-flop FFX is defined as a time span during which the input data signal should remain stable after the rising-edge time Te. A time window that defines the valid period of the input data is thus comprised of the setup time and the hold time. The setup time and the hold time required for a sequential cell, such as the flip-flop FFX, is determined by the design of the cell, and thus the electrical characteristics, such as circuit design, circuit topology, and manufacturing process, of the cell may affect the eventual setup time and hold time of the cell. Therefore, the setup time and the hold time of each cell should be determined properly and included in the library for facilitating the design process.

Figure 3A:
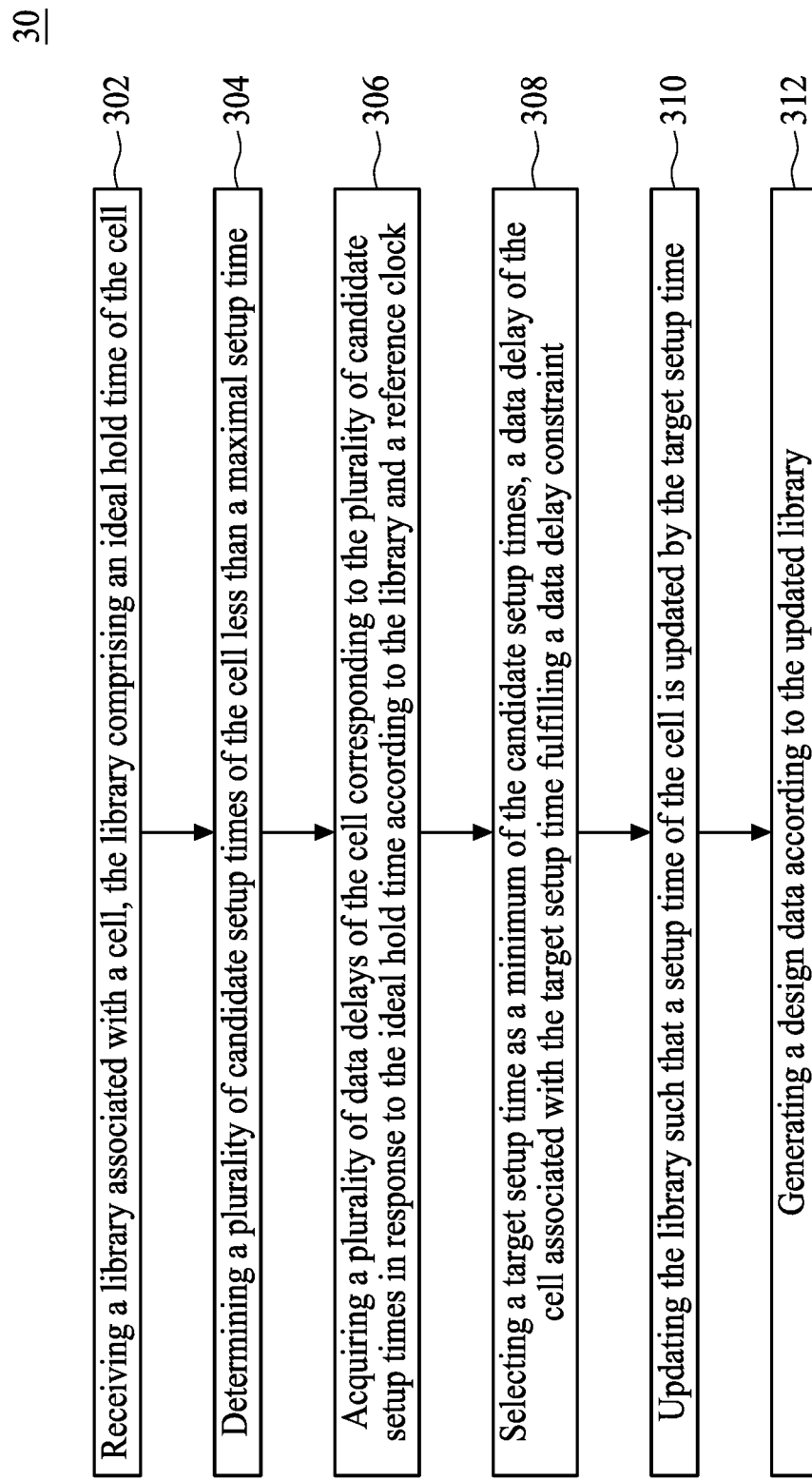
FIG. 3A is a schematic flow diagram of a method of measuring a setup time based on a predetermined hold time, in accordance with some embodiments.
Figure 3B:
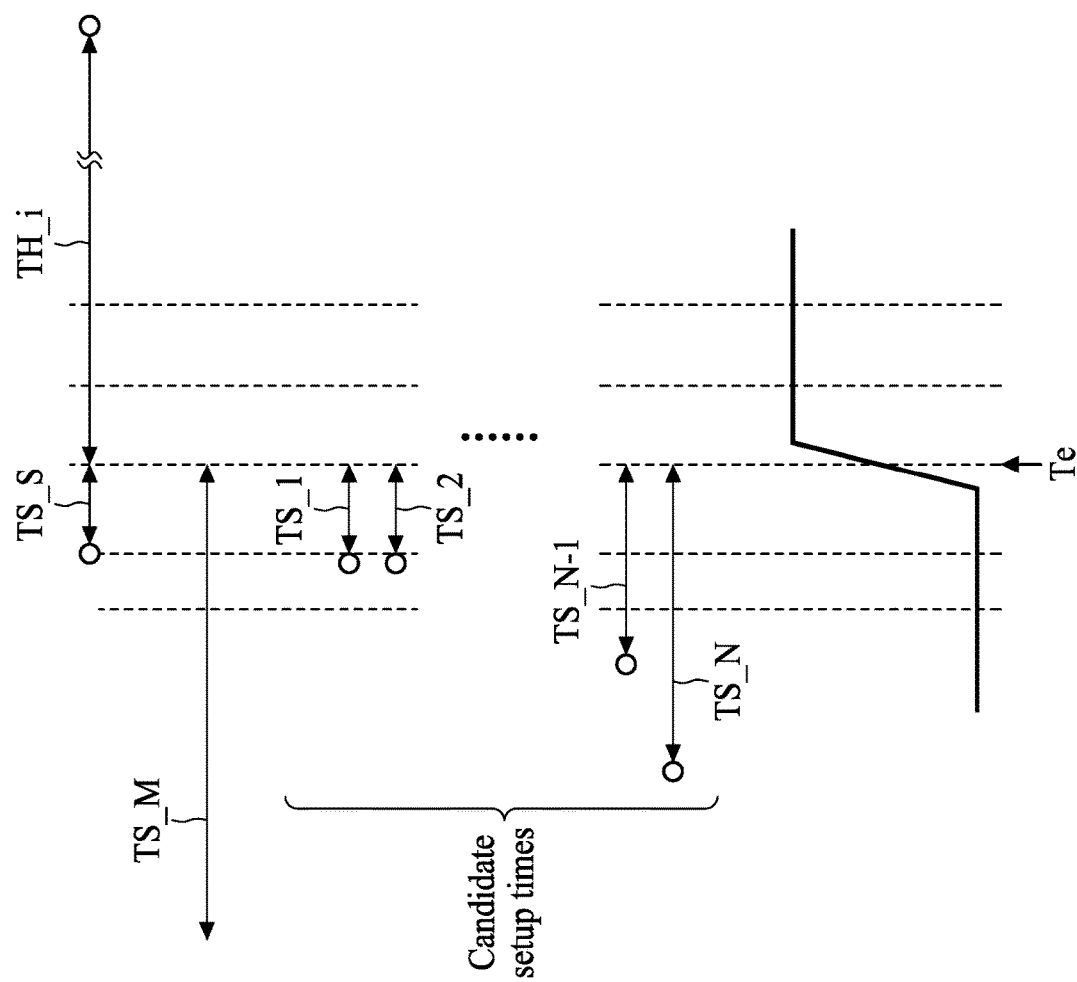
FIG. 3B is a schematic diagram showing candidate setup times of FIG. 3A, in accordance with some embodiments.

FIG. 3A is a schematic flow diagram of a method 30 of measuring a setup time based on a predetermined hold time, in accordance with some embodiments. FIG. 3B is a schematic diagram showing candidate setup times of FIG. 3A, in accordance with some embodiments. Initially, in step 302, a library associated with a cell is received. The cell is a sequential cell and may be a flop, a latch or a register. A predetermined hold time is also received. In an embodiment, the predetermined hold time is an ideal hold time TH_i of the cell. For an ordinary cell, the determination procedures of its setup time and its hold time are correlated. Moreover, when the setup time of a cell is set large enough, the hold time of the cell may be substantially at its minimum and will not be reduced further. The same result applies to the hold time of the cell. In view of the above, throughout the present disclosure, the ideal hold time TH_i of the cell is defined as an arbitrarily large time span for which the acquired setup time of the cell is substantially at its minimum in response to the ideal hold time. In an embodiment, the ideal hold time TH_i is set as a cycle time of a reference clock for the cell.

In step 304, a plurality of candidate setup times (represented by [TS_1, TS_2, . . . , TS_N], in which N is a positive integer) of the cell, which are less than or no greater than a maximal setup time TS_M, are determined. The respective plots of candidate setup times are shown in FIG. 3B. In an embodiment, the maximal setup time TS_M is set as a cycle time of the reference clock for the cell. In an alternative embodiment, the maximal setup time TS_M is set as one half, one third, one tenth or other smaller ratios of the clock cycle time. The candidate setup times may be set as greater than a predetermined minimal setup time TS_S. In an embodiment, the candidate setup times are arranged in an arithmetic sequence, e.g., [a, a+d, a+2d, . . . a+(N−1)d]. In an embodiment, each pair of consecutive candidate setup times of the plurality of candidate setup times has a same time length difference. In an embodiment, the candidate setup times are provided using another form of sequence, e.g., the setup times form a series of $[a, ar, ar^2, ar^3, \ldots, ar^{N-1}]$ in which the initial term a and the ratio r are real numbers.

In step 306, a simulation is conducted to acquire a plurality of data delays of the cell corresponding to the plurality of candidate setup times. The simulation is conducted in response to the ideal hold time TH_i according to the library and the reference clock. In order to acquire information about characteristics of the cell, at least one test input data signal is fed to the cell through the input port during a time span in accordance with one of the plurality of candidate setup times and the ideal hold time. An output data signal is detected at the output port of the cell with a data delay corresponding to the selected candidate setup time. In an embodiment, the ideal hold time TH_i is set as a value smaller than the cycle time of the reference clock signal but much greater than a typical clock-to-Q time, e.g., an order of magnitude greater than the typical clock-to-Q time in which the typical clock-to-Q time can be provided, e.g., by the cell library. The ideal hold time TH_i is kept unchanged in acquiring data delays for the different candidate setup times and is independent of the plurality of candidate setup times. In some embodiments, more instances of testing signals may be used in the simulation of step 306 such that the target setup time TS_t is able to cover as many long timing paths as possible.

In step 308, a target setup time TS_t is selected as a minimum time span among the candidate setup times, and a data delay associated with the target setup time TS_t fulfills a data delay constraint. It is required that the output data signal attains its desired value with a data delay after the input data signal within the specified data delay constraint, referred to as a clock-to-Q constraint. The data delay constraint is a predetermined parameter of the cell provided in the cell library and may include a nominal clock-to-Q time plus a delay tolerance. The delay tolerance may be represented as a ratio with respect to the nominal clock-to-Q time. For example, the nominal clock-to-Q time is determined as 400 ps and the delay tolerance is set as 10%, which means that the valid data delay of the cell is 440 ps. As a result, the target setup time TS_t is regarded as the minimal setup time among the candidate setup times within the setup time search space that fulfills the data delay constraint.

In an embodiment, the target setup time TS_t is acquired by a search method, such as a binary search algorithm. An exemplified binary search method may be started by sorting the list of candidate setup times in an ascending or descending order. Next, the middle element of the setup time list is picked and subjected to the simulation. If the simulation result shows that the resultant data delay for the middle setup time fails to meet the data delay constraint, one half of the list is chosen with the candidate setup times greater than that of the middle element. Otherwise, if the simulation result shows that the resultant data delay for the middle element passes the clock-to-Q constraint, another half of the list is chosen with the candidate setup times less than that of the middle element. The search process is iterated in a similar way on the remaining elements of the chosen half list. For example, a new middle element for the chosen half list is selected and subjected to the simulation again, while the scale of the searched set is reduced by one half in each iteration. The abovementioned iteration is continued until the target setup time TS_t is determined. However, the binary search algorithm is for illustration only. Other search algorithms for determining the target setup time TS_t are also within the scope of the present disclosure.

In step 310, the library is updated such that a setup time of the cell is updated by the target setup time TS_t selected in step 308. The updated library, e.g., the library 132 in FIG. 1, will be provided to the IC designer for conducting the circuit design procedure as shown in FIG. 1. In step 312, e.g., a design data is generated using the updated library. For instance, in step 312, at least a portion of the operations in the flow 10 in FIG. 1 are performed according to the updated library.

Referring back to step 304, the plurality of setup times [TS_1, TS_2, . . . , TS_N] are determined to be greater than the minimal setup time in some examples. The minimal setup time for limiting the end point of the candidate setup times [TS_1, TS_2, . . . , TS_N] may be acquired by simulating a testing design data in response to the ideal hold time TH_i. That is because an optimistic estimate of the setup time acquired based on an infinite or relatively large hold time can serve as a minimum of the candidate setup times. As a result, the space for determining the candidate setup times is further reduced.

Figure 3C:
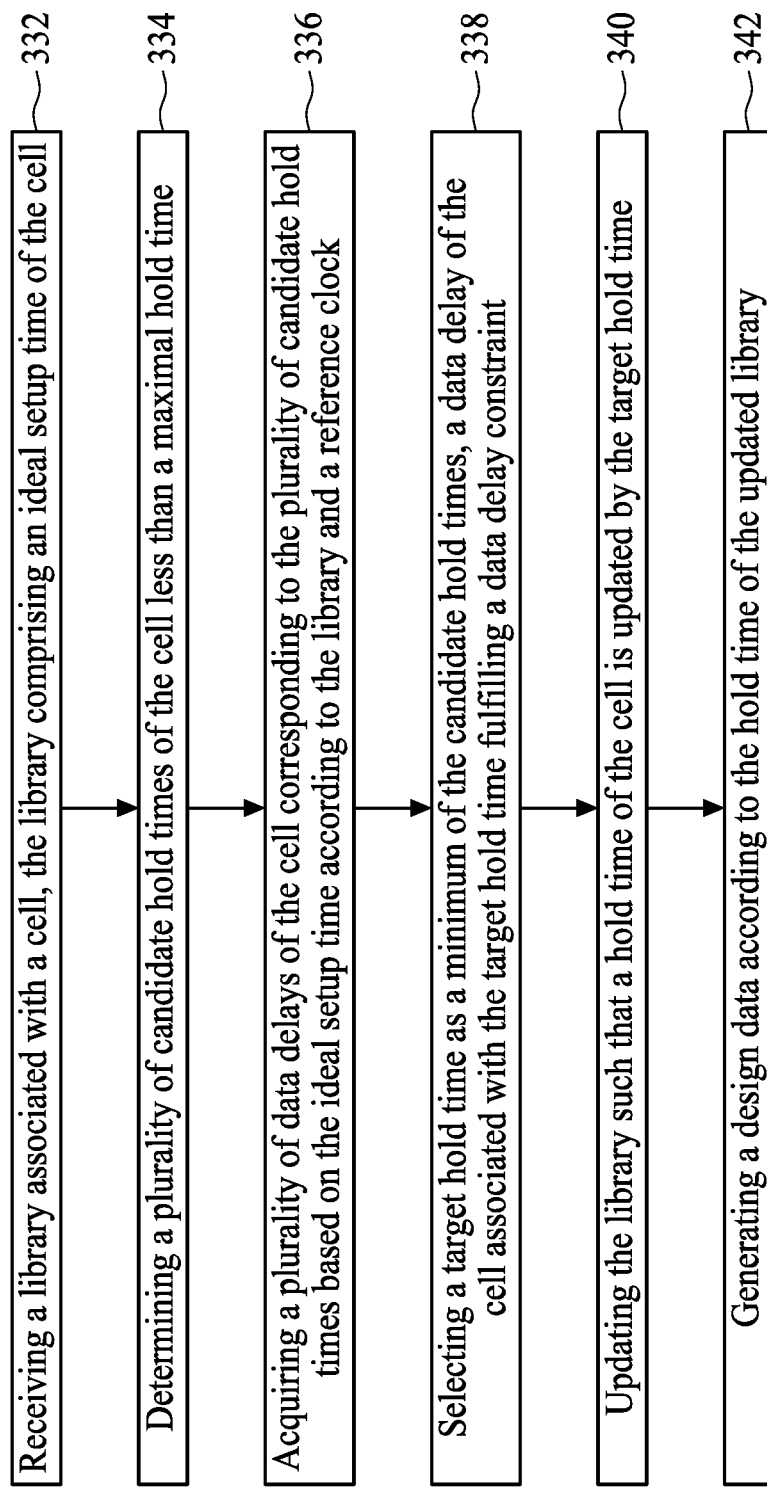
FIG. 3C is a schematic flow diagram of a method of measuring a hold time based on a predetermined setup time, in accordance with some embodiments.

FIG. 3C is a schematic flow diagram of a method 32 of measuring a hold time based on a predetermined setup time, in accordance with some embodiments. The method 32 for measuring a target hold time TH_t is similar to the method 30 of FIG. 3A for measuring the target setup time TS_t. The schematic diagram of candidate hold times for method 32 is similar to that of the time diagram 31 in FIG. 3B, and is therefore omitted herein for brevity. Initially, in step 332, a library associated with a cell is received. The library may correspond to the library 132 in FIG. 1. The cell is a sequential cell and may be a flop, a latch or a register. A predetermined setup time is also received. In an embodiment, the predetermined setup time is set as an ideal setup time $TS\_i$. Throughout the present disclosure, the ideal setup time $TS\_i$ of the cell is defined as an arbitrarily large time span for which the acquired hold time of the cell in response to the ideal setup time is substantially at its minimum. In an embodiment, the ideal setup time $TH\_i$ is set as a cycle time of the reference clock for the cell. In an embodiment, the ideal setup time $TS\_i$ is set as a value smaller than the cycle time of the reference clock signal but much greater than a typical clock-to-Q time, e.g., an order of magnitude greater than the typical clock-to-Q time.

In step 334, a plurality of candidate hold times (represented by $[TH\_1, TH\_2, \ldots, TH\_N]$) of the cell, which are less than or no greater than a maximal hold time $TH\_M$, are determined. In an embodiment, the maximal hold time $TH\_M$ is set as a cycle time of the reference clock signal for the cell. In an alternative embodiment, the maximal hold time $TH\_M$ is set as one half, one third, one tenth or other ratio of the clock cycle time. The candidate hold times may be set at greater than zero or at a predetermined minimal hold time. The minimal hold time for limiting the end point of the candidate hold times $[TH\_1, TH\_2, \ldots TH\_N]$ may be acquired by simulating a testing design data in response to the ideal setup time $TS\_i$. In an embodiment, the candidate hold times are formed as an arithmetic sequence. In an embodiment, each pair of consecutive candidate hold times of the plurality of candidate hold times has a same difference. In an embodiment, the candidate hold times are arranged as other forms of sequences, e.g., the candidate hold times form a series of $[a, ar, ar^2, ar^3, \ldots ar^{N-1}]$ in which the initial term a and the ratio r are real numbers. In some embodiments, each pair of consecutive candidate hold times of the plurality of candidate hold times has a non-uniform time length difference.

In step 336, a simulation is conducted to acquire a plurality of data delays of the cell corresponding to the plurality of candidate hold times. The simulation is conducted in response to the ideal setup time $TS\_i$ according to the library and the reference clock. In order to acquire information about the characteristics of the cell, at least one test input signal is fed to the cell through the input port of the cell during a time span in accordance with the ideal setup time and one of the plurality of candidate hold times. An output signal is detected at the output port of the cell with a data delay corresponding to the selected candidate hold time. The ideal setup time $TS\_i$ is kept unchanged during the simulation while acquiring the data delays for different candidate hold times, and the ideal setup time $TS\_i$ is independent of the plurality of candidate hold times.

In step 338, a target hold time $TH\_t$ is selected as a minimum time span among the candidate hold times in which a data delay of the cell associated with the target hold time $TH\_t$ fulfills a clock-to-Q constraint. In an embodiment, the data delay constraint used for measuring the target hold time $TH\_t$ is the same as that used for measuring the target setup time $TS\_t$. In step 340, the library is updated such that a hold time of the cell is updated by the target hold time $TH\_t$ selected in step 338. The updated library, e.g., the library 132 in FIG. 1, will be provided to the IC designer for conducting the circuit design procedure as shown in FIG. 1. In step 342, e.g., a design data is generated using the updated library. For instance, in step 342, at least a portion of the operations in the flow 10 in FIG. 1 are performed according to the updated library. In some embodiments, more instances of testing design data may be used in step 336 such that the target hold time $TH\_t$ is able to cover as many long timing paths as possible.

As discussed previously, the target setup time $TS\_t$ and the target hold time $TH\_t$, or their combined time window, measured for a cell, determine the period required for the input data to remain stable. As a result, as the time window is lengthened, the clock rate may be reduced accordingly. Some simplified measurement methods demonstrated in FIGS. 3A and 3C determine the setup time and the hold time independently by ignoring the finite-length effect of their counterparts (i.e., the ideal hold time and ideal setup time). Although such approaches may measure a setup time or hold time with sufficiently short length, they may not be adequate in dealing with timing violations resulting from a large discrepancy in timing path delay, as exemplified in FIG. 2A. In the descriptions that follow, embodiments of the joint measurement methods for the setup time and the hold time are illustrated. The setup time and hold time using the joint determination approach are longer than those determined using the simplified methods while still falling within an acceptable range, and are also able to help with discovery of more potential timing violations.

Figure 4A:
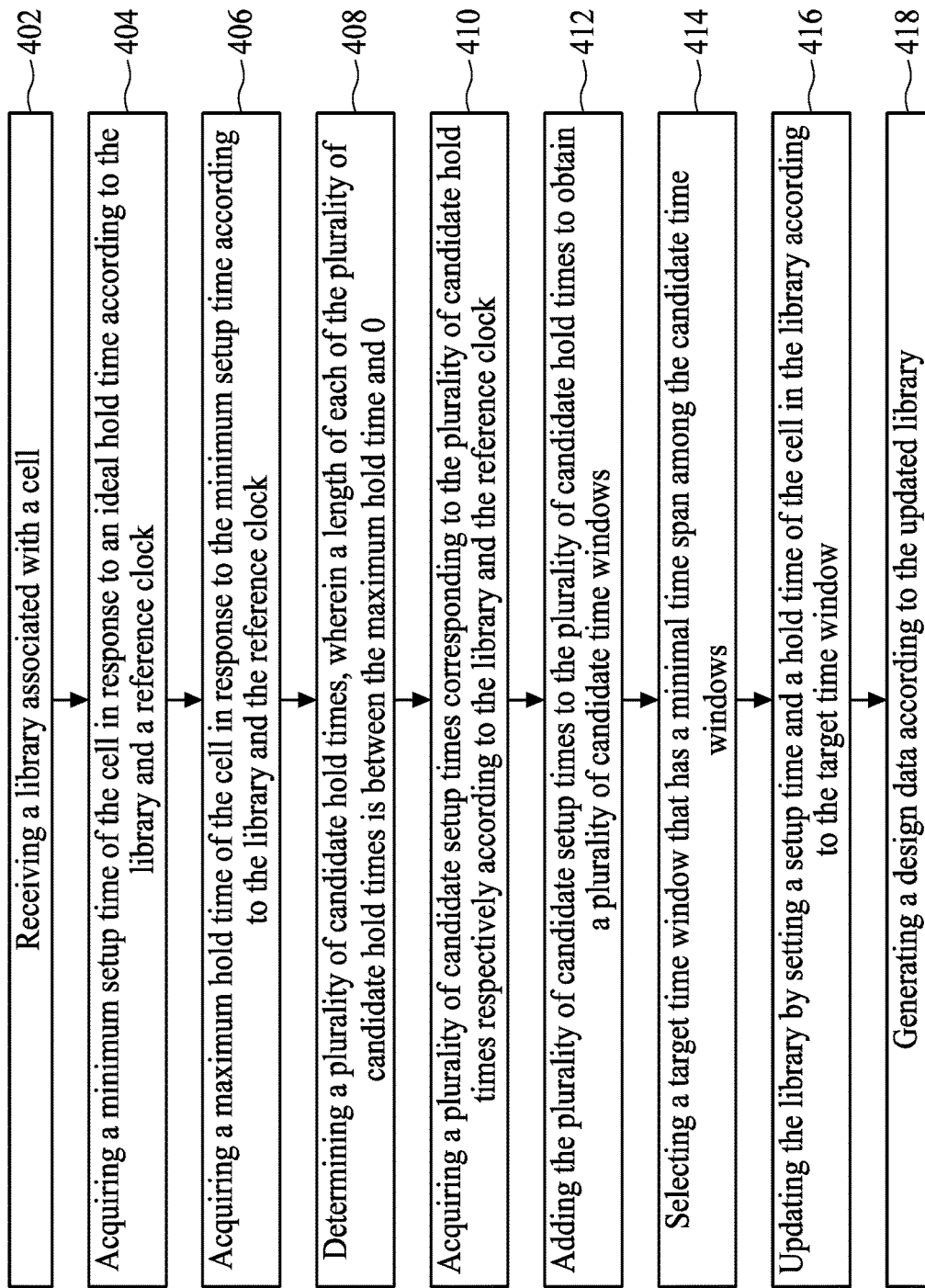
FIG. 4A is a schematic flow diagram of a method of measuring a timing window in accordance with some embodiments.
Figure 4B:
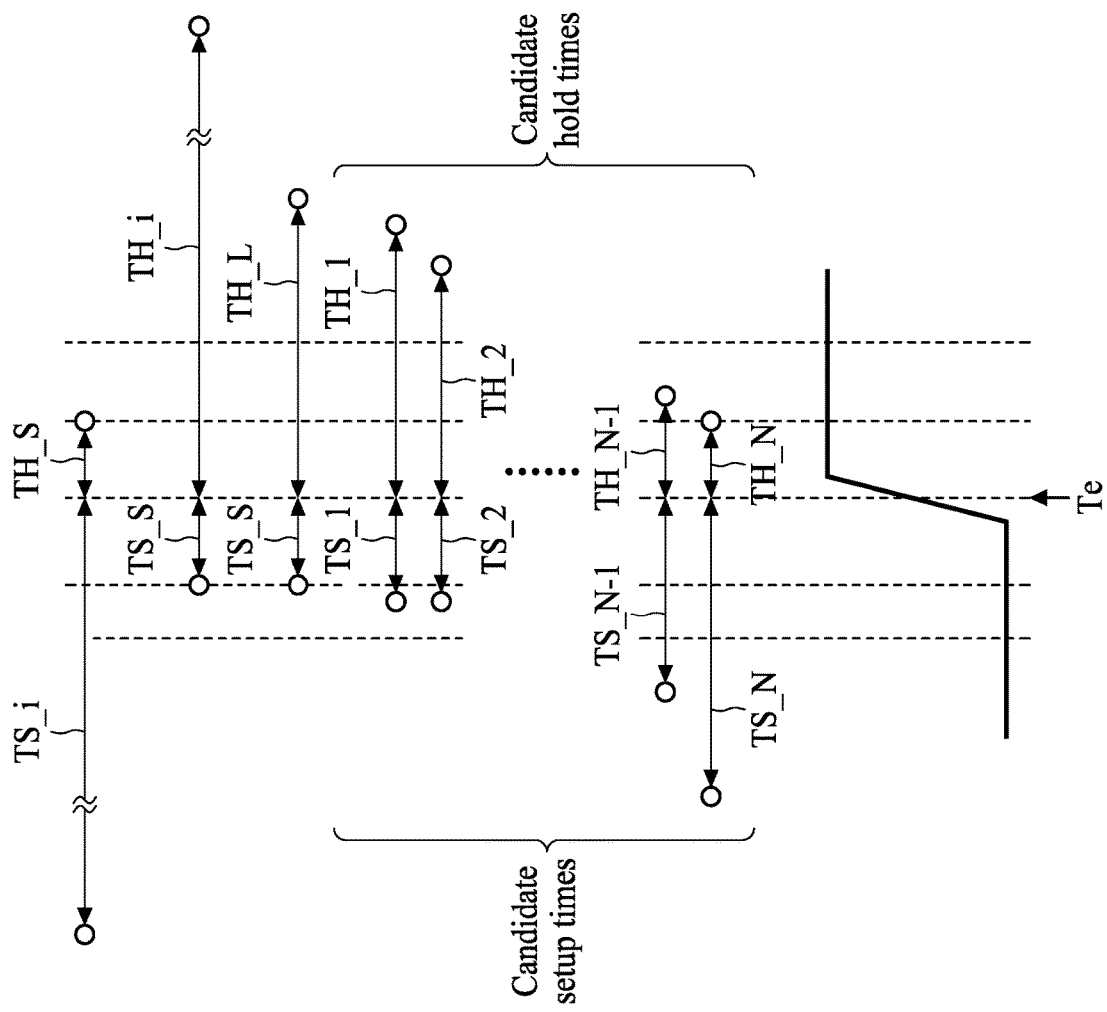
FIG. 4B is a schematic diagram showing candidate timing windows of FIG. 4A, in accordance with some embodiments.

FIG. 4A is a schematic flow diagram of a method 40 of measuring a timing window in accordance with some embodiments. FIG. 4B is a schematic diagram 41 showing candidate timing windows of FIG. 4A in accordance with some embodiments. Initially, in step 402, a library associated with a cell is received. The library may correspond to the library 132 in FIG. 1. The cell is a sequential cell and may be a flop, a latch or a register.

In step 404, a minimum setup time $TS\_S$ of the cell is acquired in response to an ideal hold time $TH\_i$ according to the library and a reference clock. The minimum setup time $TS\_S$ may be acquired using the method 30 depicted in FIG. 3A in which the target setup time $TS\_t$ of method 30 is acquired in response to the ideal hold time $TH\_i$. Operation details are omitted for simplicity and clarity.

In an embodiment, a minimal hold time $TH\_S$ is determined based on an ideal setup time $TS\_i$. The determination method for measuring the minimal hold time $TH\_S$ is similar to that used for measuring the minimal setup time $TS\_S$, which is illustrated in accordance with the method 32 depicted in FIG. 3C.

In step 406, a maximal hold time $TH\_L$ of the cell is acquired in response to the minimal setup time $TS\_S$ according to the library and the reference clock. Since the minimal setup time $TS\_S$ is less than that of the ideal setup time $TS\_i$, the maximal hold time $TH\_L$ corresponding to the minimal setup time $TS\_S$ will be greater than the minimal hold time $TH\_S$ corresponding to the ideal setup time $TS\_i$. In an embodiment, the maximal hold time $TH\_L$ is acquired in a manner similar to that used for acquiring the target hold time $TH\_t$ using the method 32 depicted in FIG. 3C, in which the ideal setup time $TS\_i$ in step 336 is replaced by the minimal setup time $TS\_S$. The remaining operation configurations of method 32 are kept unchanged.

In step 408, a plurality of candidate hold times $[TH\_1, TH\_2, \ldots, TH\_N]$ of the cell are acquired. In an embodiment, a length of each of the plurality of candidate hold times is between zero and the maximal hold time $TH\_L$. In an embodiment, a length of each of the plurality of candidate hold times is between the minimal hold time $TH\_S$ and the maximal hold time $TH\_L$. The respective plots for the candidate hold times are shown in FIG. 4B. In an embodiment, the candidate hold times are arranged in an arithmetic sequence. In an embodiment, the candidate hold times are provided using another form of sequence.

In step 410, a plurality of candidate setup times, e.g., [TS_1, TS_2, ..., TS_N], corresponding to the plurality of candidate hold times are acquired. In an embodiment, each of the candidate setup times TS_n, n=1, ..., N is acquired using an operation similar to the method 30, in which the ideal hold time TH_i in step 306 is replaced by a candidate hold time TH_n, n=1, ..., N. To elaborate, for a candidate hold time TH_n, a new plurality of candidate setup times TS_m, m=1, ..., M, in which M is a positive integer, are determined such that the new plurality of candidate setup times TS_m, m=1, ..., M, are different from the candidate setup times TS_n, n=1, ..., N. The candidate setup time TS_n is selected as a minimum of the new plurality of candidate setup times TS_m in which a data delay of the cell associated with the candidate setup time TS_n fulfills the data delay constraint specified in the library. In an embodiment, a plurality of the candidate setup times TS_n are acquired in an increasing order of the time spans of the candidate hold times in an attempt to reduce the search time. In an embodiment, the plurality of the candidate setup times are acquired in decreasing order of the time lengths of the candidate hold times.

In step 412, the plurality of candidate setup times are added to the plurality of candidate hold times to obtain a plurality of candidate time windows. In each candidate time window of the plurality of candidate time windows, the constituent setup time and hold time are correlated. In step 414, a target time window is selected that has a minimum time span among the candidate time windows. In step 416, the library is updated in which in which a setup time and a hold time of the cell in the library are updated according to the target time window. The setup time and the hold time of the cell are set as the target setup time TS_t and the target hold time TH_t, respectively, of the target time window. The updated library, e.g., the library 132 in FIG. 1, will be provided to the IC designer for conducting the circuit design procedure as shown in FIG. 1. In step 418, a design data is generated according to the updated library. For instance, in step 418, at least a portion of the operations in the flow 10 in FIG. 1 are performed according to the updated library.

Figure 5A:
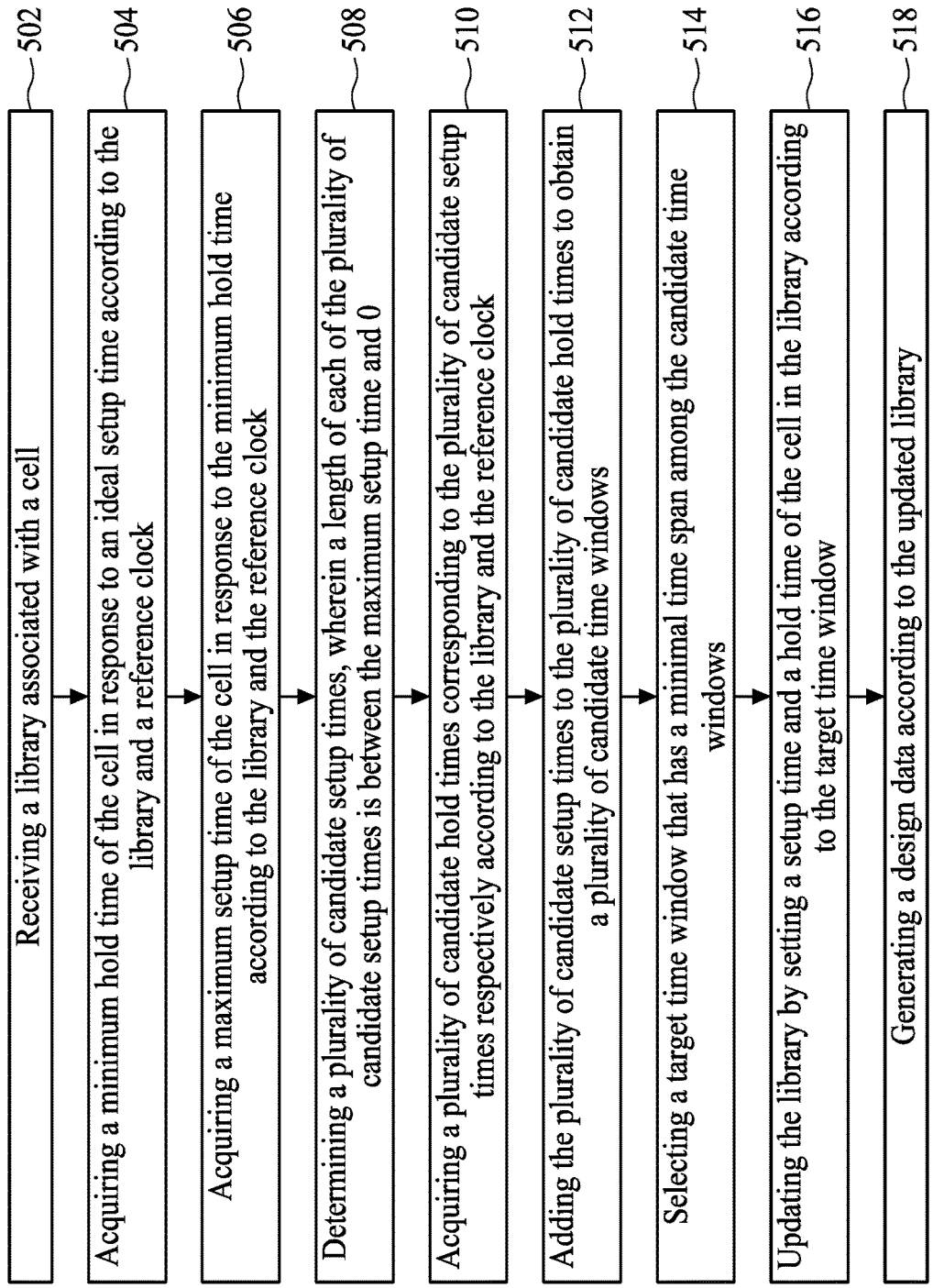
FIG. 5A is a schematic flow diagram of a method of measuring a timing window in accordance with some embodiments.
Figure 5B:
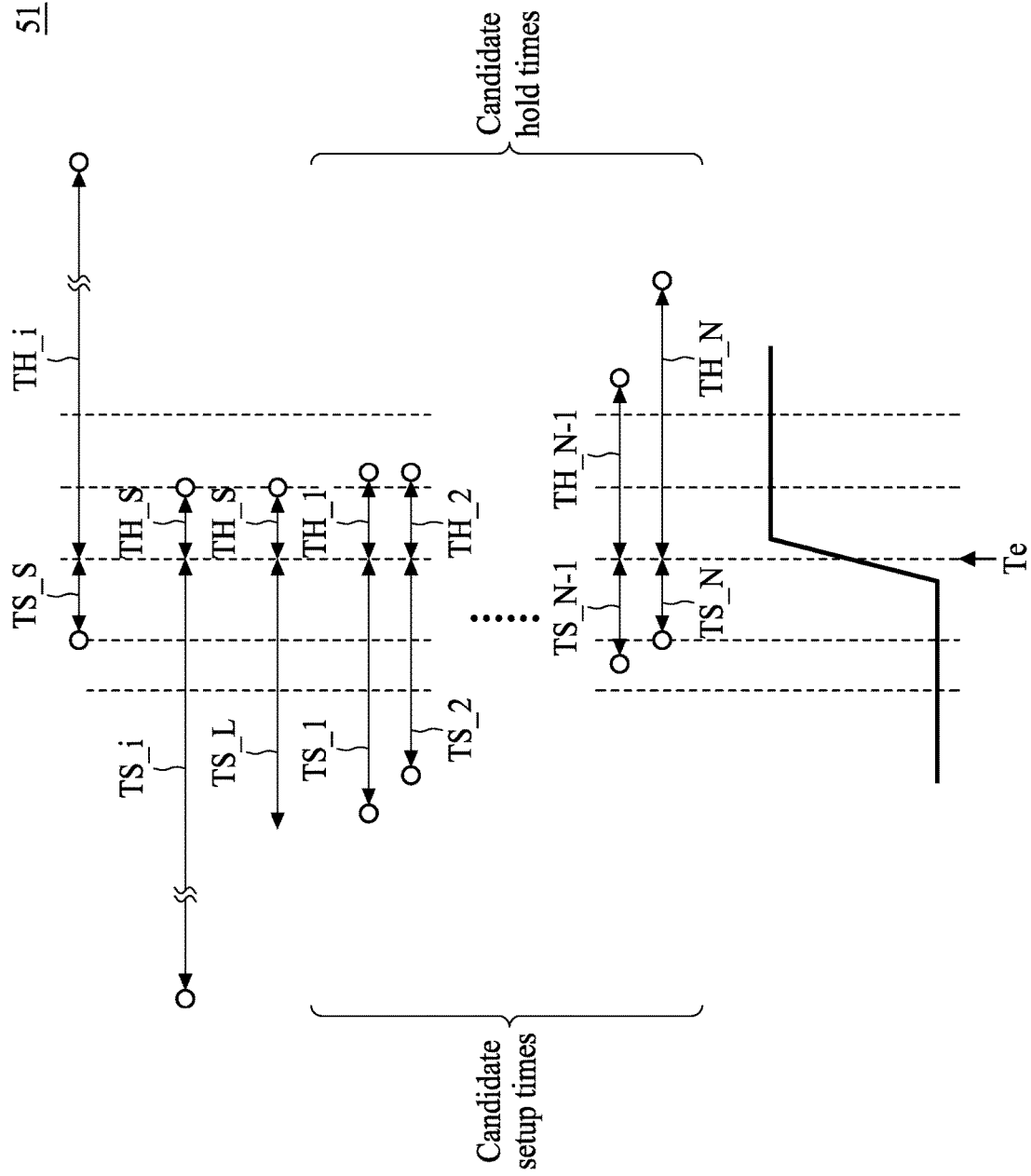
FIG. 5B is a schematic diagram showing candidate timing windows of FIG. 5A, in accordance with some embodiments.

FIG. 5A is a schematic flow diagram of a method 50 of measuring a timing window in accordance with some embodiments. FIG. 5B is a schematic diagram 51 showing candidate timing windows of FIG. 5A in accordance with some embodiments. The method 50 has operations similar to those of the method 40 except that the roles of the setup time and the hold time are interchanged. Initially, in step 502, a library associated with a cell is received. The library may correspond to the library 132 in FIG. 1. The cell is a sequential cell and may be a flop, a latch or a register.

In step 504, a minimum hold time TH_S of the cell is acquired in response to an ideal setup time TS_i according to the library and a reference clock. The minimum hold time TH_S may be acquired using the method 32 depicted in FIG. 3C, in which the target hold time TH_t of method 32 is acquired in response to the ideal setup time TS_i. In an embodiment, a minimal setup time TS_S is determined based on an ideal hold time TH_i. The determination method for measuring the minimal setup time TS_S is similar to that used for measuring the minimal hold time TH_S and is described in the method 30 depicted in FIG. 3A.

In step 506, a maximal setup time TS_L of the cell is acquired in response to the minimal hold time TH_S according to the library and the reference clock. In an embodiment, the maximal setup time TS_L is acquired in a manner similar to that used for acquiring the target setup time TS_t using the method 30 depicted in FIG. 3A, in which the ideal hold time TH_i in step 306 is replaced by the minimal hold time TH_S. The remaining operation configurations of method 30 are kept unchanged.

In step 508, a plurality of candidate setup times [TS_1, TS_2, ..., TS_N] of the cell are acquired. In an embodiment, a length of each of the plurality of candidate setup times is between 0 and the maximal setup time TS_L. In an embodiment, a length of each of the plurality of candidate setup times is between the minimal setup time TS_S and the maximal setup time TH_L. The respective plots for the candidate setup times are shown in FIG. 5B. In an embodiment, the candidate setup times are arranged in an arithmetic sequence or other sequence form.

In step 510, a plurality of candidate hold times, e.g., [TH_1, TH_2, ..., TH_N], corresponding to the plurality of candidate setup times are acquired. In an embodiment, each of the candidate hold times TH_n, n=1, ..., N is acquired using an operation similar to the method 32, in which the ideal setup time TS_i in step 336 is replaced by a candidate setup time TS_n, n=1, ..., N. To elaborate, for a candidate setup time TS_n, a new plurality of candidate hold times TH_m, m=1, ..., M, in which M is a positive integer, are determined such that the new plurality of candidate hold times TH_m, m=1, ..., M, are different from the candidate hold time TH_n, n=1, ..., N. The candidate hold time TH_n is selected as a minimum of the new plurality of hold times TH_m, in which a data delay of the cell associated with the candidate hold time TH_n fulfills a predetermined data delay constraint specified in the library. In an embodiment, the plurality of candidate hold times TH_n are acquired in increasing order of the time lengths of the candidate setup times in an attempt to reduce the search time. In an embodiment, the plurality of the candidate setup times are acquired in an increasing order of the time spans of the candidate setup times.

In step 512, the plurality of candidate setup times are added to the plurality of candidate hold times to obtain a plurality of candidate time windows. In each of the plurality of candidate time windows, the constituent setup time and hold time are correlated. In step 514, a target time window is selected that has a minimum time span among the candidate time windows. In step 516, the library is updated such that a setup time and a hold time of the cell in the library are updated according to the target time window. In step 518, a design data is generated according to the updated library. For instance, in step 518, at least a portion of the operations in the flow 10 in FIG. 1 are performed according to the updated library.

Figure 6A:
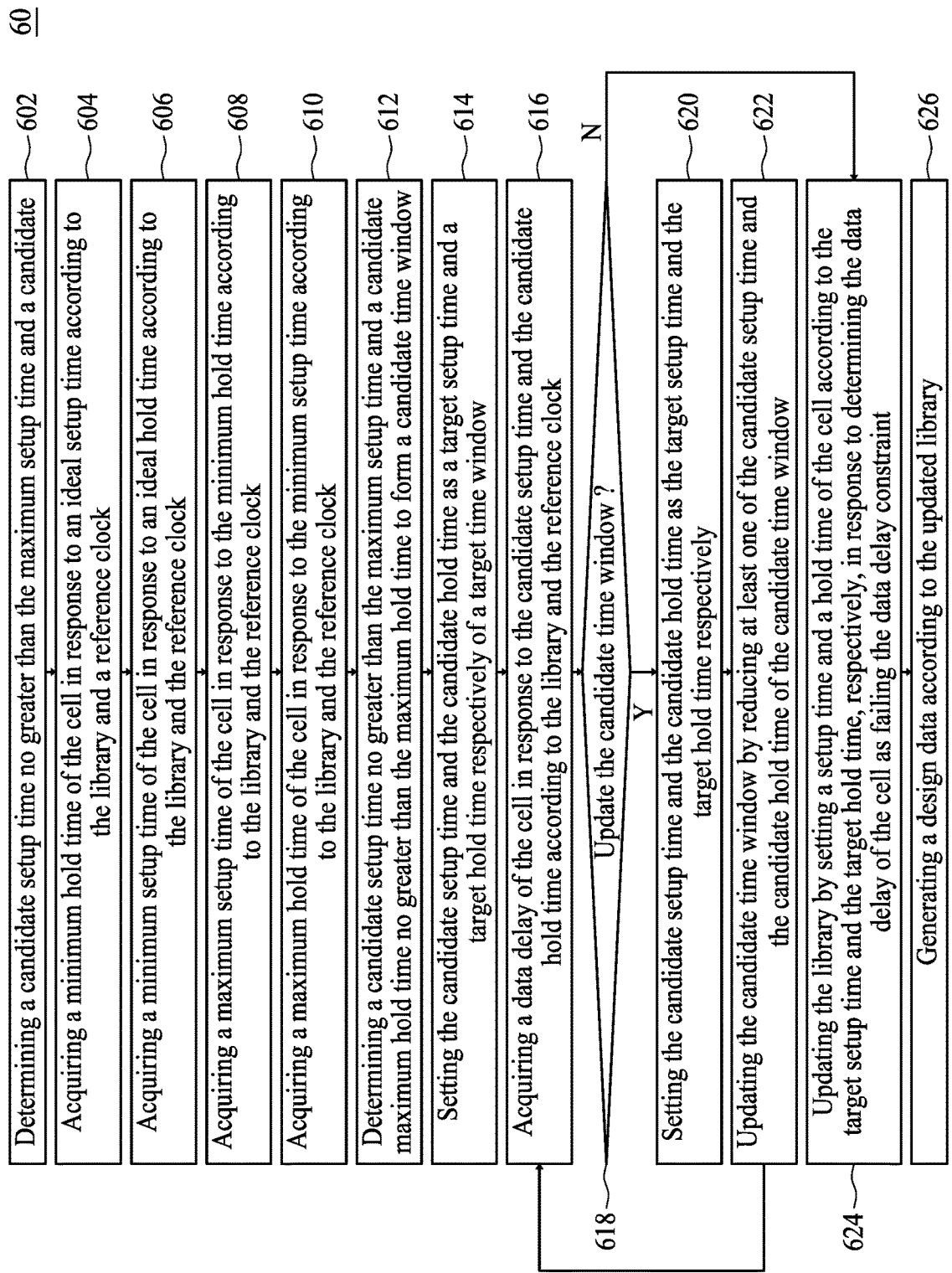
FIG. 6A is a schematic flow diagram of a method of measuring a timing window in accordance with some embodiments.
Figure 6B:
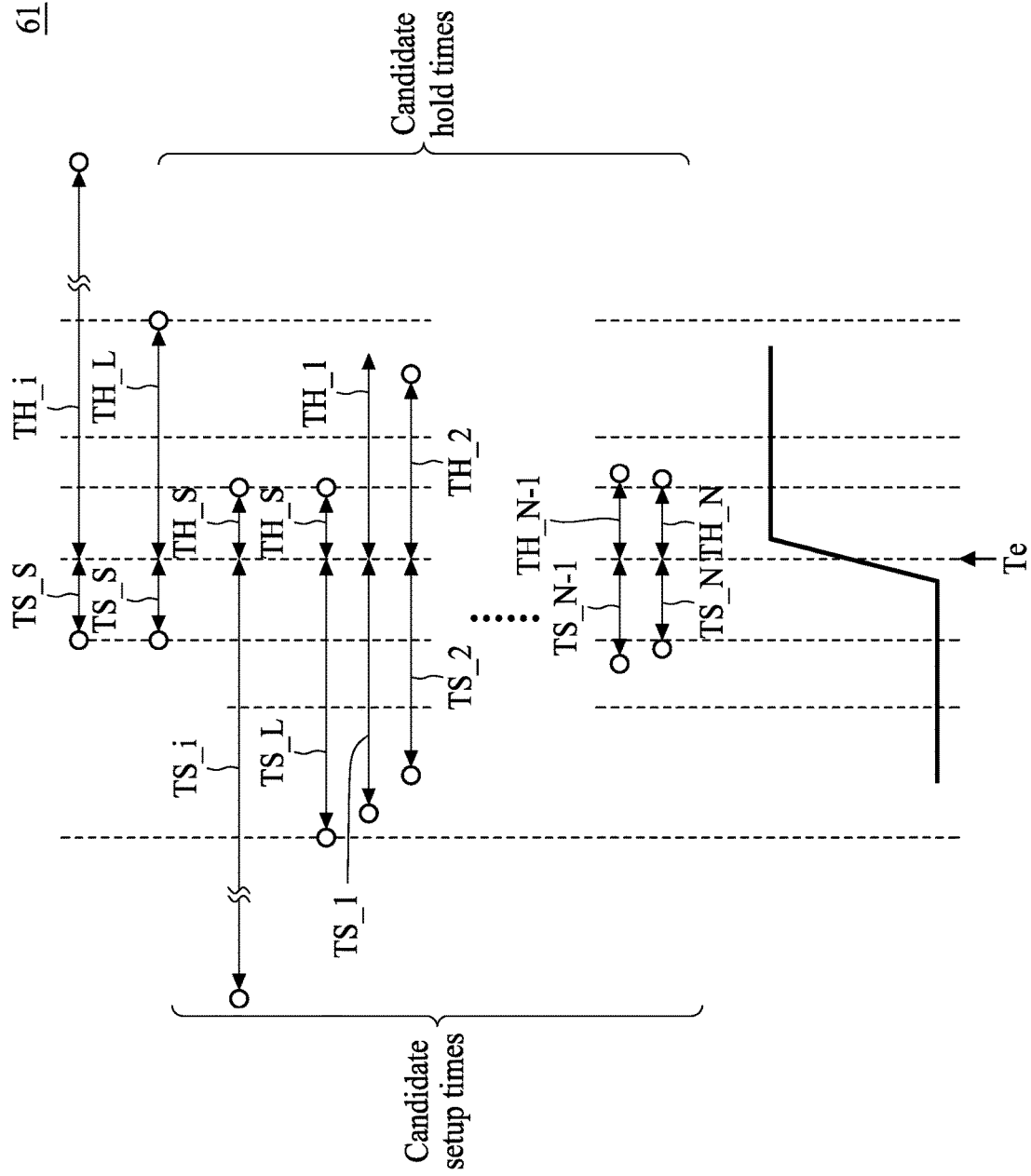
FIG. 6B is a schematic diagram showing candidate timing windows of FIG. 6A, in accordance with some embodiments.

FIG. 6A is a schematic flow diagram of a method 60 of measuring a timing window in accordance with some embodiments. FIG. 6B is a schematic diagram 61 showing candidate timing windows of FIG. 6A in accordance with some embodiments. Initially, in step 602, a library associated with a cell is received. The library may correspond to the library 132 in FIG. 1. In step 604, a minimal hold time TH_S of the cell is acquired in response to an ideal setup time TS_i according to the library and a reference clock. In step 606, a minimal setup time TS_S of the cell is acquired in response to an ideal hold time according to the library and the reference clock. The order of steps 604 and 606 can be interchanged, or the two steps can be performed simultaneously. In an embodiment, the minimal setup time TS_S and the minimal hold time TH_S are acquired in manners similar to those of step 504 and step 404, respectively.

In step 608, a maximal setup time TS_L of the cell is acquired in response to the minimum hold time according to the library and the reference clock. Similarly, in step 610, a maximal hold time TH_L of the cell is acquired in response to the minimum setup time according to the library and the reference clock. The order of steps 608 and 610 can be interchanged, or the two steps can be performed simultaneously. In an embodiment, the maximal setup time TS_L and the maximal hold time TH_L are acquired in manners similar to those of step 506 and step 406, respectively. As discussed previously, the maximal setup time TS_L and the maximal hold time TH_L will be greater than the minimal setup time TS_S and the minimal hold time TH_S, respectively.

In step 612, a candidate setup time TS_1, which is no greater than the maximum setup time, and a candidate hold time TH_1, which is no greater than the maximum hold time, are determined to form a candidate time window. The respective plots are shown in FIG. 6B. In an embodiment, the candidate time window is determined as an initial time window. In step 614, the (initial) candidate setup time and the (initial) candidate hold time are set as a target setup time and a target hold time, respectively, of a target time window. Subsequently, in step 616, a data delay of the cell in response to the (initial) candidate setup time and the (initial) candidate hold time is acquired according to the library and the reference clock.

In step 618, it is determined whether to update the candidate time window. In an embodiment, the determination of whether to update the candidate time window is based on results of examining whether the data delay of the cell associated with the (initial) candidate time window fulfills the data delay constraint. If affirmative, it is indicated that the current candidate time window is adequate for fulfilling the data delay constraint, but may not be the optimal time window. The method 60 proceeds with step 620 in which the (current) candidate setup time and the (current) candidate hold time (e.g., TS_1 and TH_1 in FIG. 6B) are set as the target setup time and the target hold time, respectively. Subsequently, the current candidate time window is updated by reducing at least one of the (current) candidate setup time and the (current) candidate hold time of the (current) candidate time window. An updated time window is thus obtained that includes an updated setup time and an updated hold time (e.g., TS_2 and TH_2 in FIG. 6B). In an embodiment, the candidate time window obtained in step 622 is reduced iteratively by reducing one of the candidate setup time and the candidate hold time, or both. In an embodiment, the reduced candidate setup time or hold time has a duration of x % of its previous candidate setup time or hold time, in which x a number less than 100, e.g., 90, 85 or 80. In an embodiment, the reduction ratio between the two consecutive candidate time windows may be the same or different. The method 60 loops back to step 616, in which a data delay of the cell is acquired in response to the (updated) candidate setup time and the (updated) candidate hold time (e.g., TS_2 and TH_2 in FIG. 6B) according to the library and the reference clock. The loop formed by the steps 616, 618 and 620 is iterative, and the status is monitored in step 618 of each iteration to determine whether the data delay of the cell associated with the current candidate time window causes a data delay that fulfills the data delay constraint. Referring back to step 618, if it is determined during an iteration that a candidate time window including a candidate setup time and a candidate hold time (e.g., TS_n and TH_n) is reduced to become too short to cause a corresponding data delay that fulfills the data delay constraint, it is indicated that the previous candidate time window including the candidate setup time and candidate hold time (e.g., TS_(n−1) and TH_(n−1)) should be the desired setup time and hold time. It should be noted that such desired setup time and hold time have been recorded as the target setup time and target hold time in a previous iteration in step 620. The method 60 will therefore terminate the loop by halting the further update to the candidate setup time and the candidate hold time. Next, the method proceeds with step 624, in which the library is updated by setting a setup time and a hold time of the cell according to the target setup time and the target hold time, respectively, in response to determining that the data delay of the cell fails to meet the data delay constraint. That will guarantee that the target setup time and target hold time that fulfill the data delay constraint have a minimal time window. In step 626, a design data is generated according to the updated library. For instance, in step 626, at least a portion of the operations in the flow 10 in FIG. 1 are performed according to the updated library.

Figure 7:
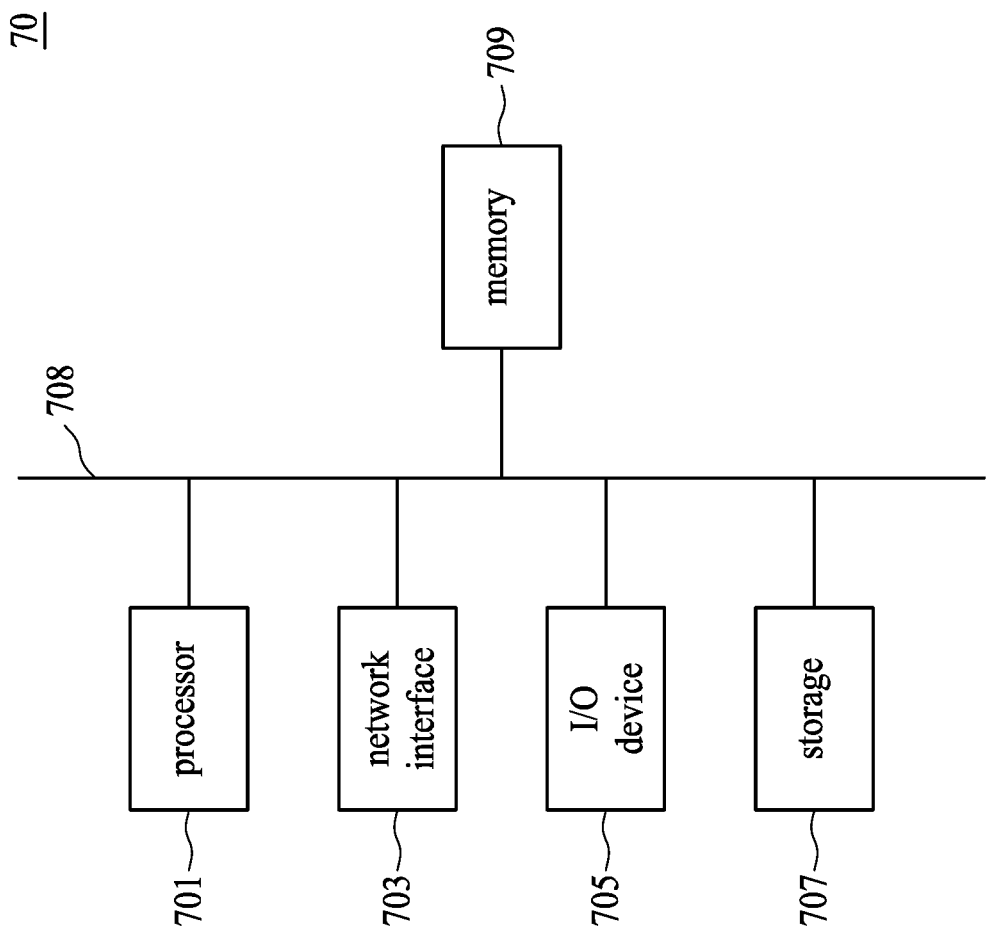
FIG. 7 is a schematic diagram of a system implementing layout designs, in accordance with some embodiments.

FIG. 7 is a schematic diagram of a system 70 implementing layout designs, in accordance with some embodiments. The system 70 includes a processor 701, a network interface 703, an input/output (I/O) device 705, a storage device 707, a bus 708 and a memory 709. The bus 708 couples the network interface 703, the I/O device 705, the storage device 707, the memory 709 and the processor 701 to each other.

The processor 701 is configured to execute program instructions that include a tool configured to perform the method as described and illustrated with reference to figures of the present disclosure. Accordingly, the tool is configured to execute the steps such as: receive design specifications and a library, perform pre-layout simulation, generate a design data for a layout, perform layout accessing, determine parameter of timing of the library, determining a plurality of candidate setup times or hold times, perform a binary search algorithm, update the library, perform operations of placement and routing, perform LVS, generate a consolidated netlist by incorporating the parameters, perform post-layout simulation and verify the post-layout simulation result.

The network interface 703 is configured to access program instructions and data accessed by the program instructions stored remotely through a network (not shown).

The I/O device 705 includes an input device and an output device configured for enabling user interaction with the system 70. In some embodiments, the input device includes, for example, a keyboard, a mouse and other devices. The output device includes, for example, a display, a printer and other devices.

The storage device 707 is configured for storing program instructions and data accessed by the program instructions. In some embodiments, the storage device 707 includes a non-transitory computer readable storage medium, for example, a flash memory, a magnetic disk, an optical disk or the like.

The memory 709 is configured to store program instructions to be executed by the processor 701 and data accessed by the program instructions. In some embodiments, the memory 709 includes any combination of a random access memory (RAM), some other volatile storage device, a read only memory (ROM), and some other non-volatile storage device.

According to an embodiment, a method is provided. The method includes: receiving a library associated with a cell; determining a plurality of candidate hold times for the cell; acquiring a plurality of candidate setup times corresponding to the plurality of candidate hold times, wherein a data delay associated with each of the candidate setup time fulfills a data delay constraint for the cell; adding the plurality of candidate setup times to the plurality of candidate hold times, respectively, to obtain a plurality of candidate time windows; and selecting a target time window having a minimal time span among the candidate time windows. At least one of the receiving, determining, acquiring, adding and selecting steps is conducted by at least one processor.

According to an embodiment, a method is provided. The method includes: receiving a library associated with a cell; determining a plurality of candidate setup times for the cell; acquiring a plurality of candidate hold times corresponding to the plurality of candidate setup times, wherein a data delay associated with each of the candidate hold time fulfills a data delay constraint for the cell; adding the plurality of candidate setup times to the plurality of candidate hold times, respectively, to obtain a plurality of candidate time windows; and selecting a target time window having a minimal time span among the candidate time windows. At least one of the receiving, determining, acquiring, adding and selecting steps is conducted by at least one processor.

According to an embodiment, a method is provided. The method includes: receiving a library associated with a cell; determining a candidate setup time no greater than a maximum setup time and a candidate hold time no greater than a maximum hold time to form a candidate time window, wherein the determination of the candidate setup time is independent of the determination of the candidate hold time; setting the candidate setup time and the candidate hold time as a target setup time and a target hold time, respectively, of a target time window in response to determining the target time window as fulfilling a data delay constraint; and performing an operation loop. The operation loop includes: reducing at least one of the candidate setup time and the candidate hold time of the candidate time window to obtain an updated candidate time window; and setting the updated candidate time window as the target time window in response to determining the updated candidate time window as fulfilling the data delay constraint. The operation loop stops when the updated candidate time window fails to meet the data delay constraint. At least one of the receiving, determining, setting, performing and reducing steps is conducted by at least one processor.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:
   receiving a library associated with a cell;
   determining a plurality of candidate hold times for the cell;
   acquiring a plurality of candidate setup times corresponding to the plurality of candidate hold times, wherein a data delay associated with each of the candidate setup time fulfills a data delay constraint for the cell;
   adding the plurality of candidate setup times to the plurality of candidate hold times, respectively, to obtain a plurality of candidate time windows;
   selecting a target time window having a minimal time span among the candidate time windows;
   updating the library associated with the cell according to the target time window; and
   causing a circuit to be fabricated according to a design data of the cell,
   wherein at least one of the receiving, determining, acquiring, adding and selecting steps is conducted by at least one processor.

2. The method according to claim 1, further comprising setting a setup time and a hold time of the cell in the library according to the target time window.

3. The method according to claim 2, wherein the design data is generated according to the setup time and hold time of the cell in the library.

4. The method according to claim 1, wherein a length of each of the plurality of candidate hold times is greater than a minimum hold time of the cell, wherein the minimum hold time is acquired in response to an ideal setup time according to the library and a reference clock for the cell.

5. The method according to claim 4, the minimum hold time is acquired using a binary search algorithm.

6. The method according to claim 4, wherein a length of the ideal setup time is determined such that an acquired hold time is at its minimum in response to the ideal setup time.

7. The method according to claim 6, wherein the length of the ideal setup time is set as a cycle time of the reference clock.

8. The method according to claim 1, wherein the plurality of candidate hold times form an arithmetic sequence.

9. The method according to claim 1, wherein a length of each of the plurality of candidate hold times is less than a maximum hold time of the cell, wherein the maximum hold time is acquired in response to a minimum setup time.

10. The method according to claim 9, wherein the minimum setup time is acquired in response to an ideal hold time according to the library and a reference clock for the cell.

11. A method, comprising:
    receiving a library associated with a cell;
    determining a plurality of candidate setup times for the cell;
    acquiring a plurality of candidate hold times corresponding to the plurality of candidate setup times, wherein a data delay associated with each of the candidate hold time fulfills a data delay constraint for the cell;
    adding the plurality of candidate setup times to the plurality of candidate hold times, respectively, to obtain a plurality of candidate time windows;
    selecting a target time window having a minimal time span among the candidate time windows;
    updating the library associated with the cell according to the target time window; and
    causing a circuit to be fabricated according to a design data of the cell,
    wherein at least one of the receiving, determining, acquiring, adding and selecting steps is conducted by at least one processor.

12. The method according to claim 11, wherein the updating of the library comprises setting a setup time and a hold time of the cell in the library according to the target time window, and wherein the design data is generated according to the updated library.

13. The method according to claim 12, wherein a length of each of the plurality of candidate setup times is greater than a minimum setup time of the cell, wherein the minimum setup time is acquired in response to an ideal hold time according to the library and a reference clock.

14. The method according to claim 11, wherein each pair of consecutive candidate hold times of the plurality of candidate hold times has a non-uniform time length difference.

15. The method according to claim 14, wherein each of the plurality of candidate hold times corresponding to the plurality of candidate setup times is acquired using a binary search method.

16. A method, comprising:
receiving a library associated with a cell;
determining a candidate setup time no greater than a maximum setup time and a candidate hold time no greater than a maximum hold time to form a candidate time window, wherein the determination of the candidate setup time is independent of the determination of the candidate hold time;
setting the candidate setup time and the candidate hold time as a target setup time and a target hold time, respectively, of a target time window in response to determining the target time window as fulfilling a data delay constraint;
performing an operation loop comprising:
reducing at least one of the candidate setup time and the candidate hold time of the candidate time window to obtain an updated candidate time window; and
setting the updated candidate time window as the target time window in response to determining the updated candidate time window as fulfilling the data delay constraint,
wherein the operation loop stops when the updated candidate time window fails to meet the data delay constraint;
updating the library associated with the cell according to the target time window; and
causing a circuit to be fabricated according to a design data of the cell,
wherein at least one of the receiving, determining, setting, performing and reducing steps is conducted by at least one processor.

17. The method according to claim 16, further comprising setting a setup time and a hold time of the cell according to the target setup time and the target hold time, respectively, in response to the stop of the operation loop.

18. The method according to claim 16, wherein reducing at least one of the candidate setup time and the candidate hold time of the candidate time window comprises reducing both the candidate setup time and the candidate hold time of the candidate time window.

19. The method according to claim 16, further comprising acquiring a minimum hold time of the cell in response to an ideal setup time according to the library and a reference clock, wherein the maximum setup time is acquired based on the minimum hold time.

20. The method according to claim 16, further comprising acquiring a minimum setup time of the cell in response to an ideal hold time according to the library and a reference clock, wherein the maximum hold time is acquired based on the minimum setup time.

* * * * *